United States Patent
Kimmel et al.

(10) Patent No.: US 7,824,150 B1
(45) Date of Patent: Nov. 2, 2010

(54) MULTIPLE PIECE TURBINE AIRFOIL

(75) Inventors: Keith D Kimmel, Jupiter, FL (US); Jack W. Wilson, Jr., Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 54 days.

(21) Appl. No.: 12/467,009

(22) Filed: May 15, 2009

(51) Int. Cl.
*F01D 9/06* (2006.01)
*F01D 5/18* (2006.01)

(52) U.S. Cl. .............. 415/115; 415/116; 416/96 A; 416/97 R; 416/226

(58) Field of Classification Search ............... 415/115, 415/116, 134, 136, 138; 416/96 R, 96 A, 416/97 R, 226
See application file for complete search history.

(56) References Cited

U.S. PATENT DOCUMENTS

| | | | | |
|---|---|---|---|---|
| 3,369,792 A * | 2/1968 | Kraimer et al. | ............ | 415/115 |
| 3,644,060 A * | 2/1972 | Bryan | ............ | 416/97 R |
| 3,647,316 A * | 3/1972 | Moskowitz | ............ | 416/97 R |
| 4,537,024 A * | 8/1985 | Grosjean | ............ | 60/791 |
| 5,158,430 A * | 10/1992 | Dixon et al. | ............ | 415/134 |
| 5,975,844 A * | 11/1999 | Milazar et al. | ............ | 415/138 |
| 6,224,339 B1 * | 5/2001 | Rhodes et al. | ............ | 416/224 |
| 6,238,182 B1 * | 5/2001 | Mayer | ............ | 416/96 A |
| 6,722,850 B2 * | 4/2004 | Burdgick | ............ | 415/230 |
| 6,857,848 B2 * | 2/2005 | Fokine et al. | ............ | 415/116 |
| 7,080,971 B2 * | 7/2006 | Wilson et al. | ............ | 416/92 |
| 7,247,002 B2 * | 7/2007 | Albrecht et al. | ............ | 416/224 |
| 7,744,096 B2 * | 6/2010 | Kono | ............ | 277/644 |

* cited by examiner

*Primary Examiner*—Christopher Verdier
(74) *Attorney, Agent, or Firm*—John Ryznic

(57) ABSTRACT

A turbine airfoil, such as a rotor blade or a stator vane, for a gas turbine engine, the airfoil formed as a shell and spar construction with a plurality of dog bone struts each mounted within openings formed within the shell and spar to allow for relative motion between the spar and shell in the airfoil chordwise direction while also forming a seal between adjacent cooling channels. The struts provide the seal as well as prevent bulging of the shell from the spar due to the cooling air pressure.

10 Claims, 2 Drawing Sheets

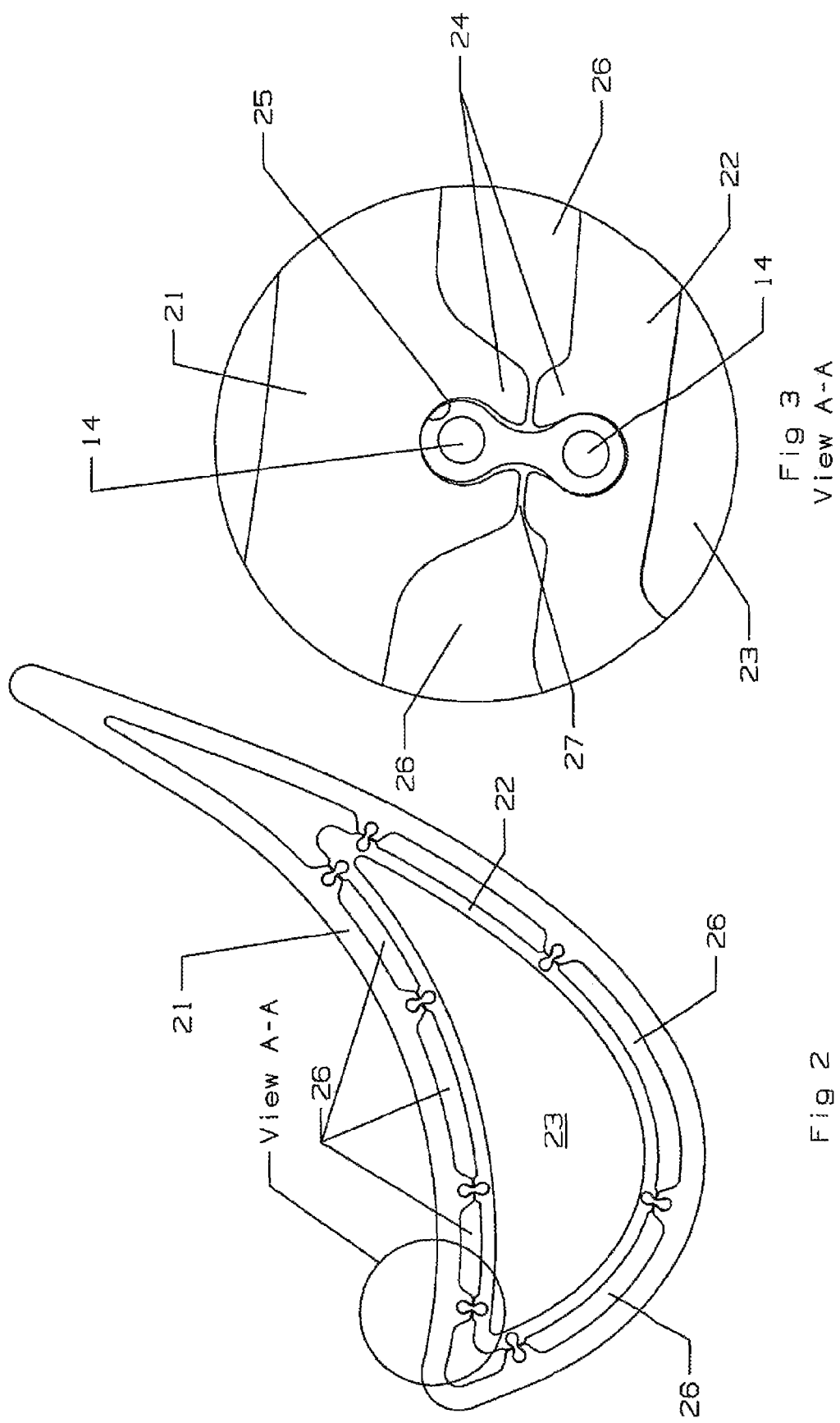

MULTIPLE PIECE TURBINE AIRFOIL

GOVERNMENT LICENSE RIGHTS

This invention was made with Government support under contract number DE-FG02-07ER84668 awarded by Department of Energy. The Government has certain rights in the invention.

CROSS-REFERENCE TO RELATED APPLICATIONS

None.

BACKGROUND OF THE INVENTION

1. Field of the Invention

The present invention relates generally to a gas turbine engine, and more specifically to an air cooled turbine airfoil with a spar and shell construction.

2. Description of the Related Art Including Information Disclosed Under 37 CFR 1.97 and 1.98

A gas turbine engine, such as an industrial gas turbine (IGT) engine, compresses air is burned with a fuel to produce a high temperature gas flow, which is then passed through a turbine having multiple rows or stages or stator vanes and rotor blades to power and aircraft or, in the case of the IGT, drive an electric generator. It is well known in the art of gas turbine engine design that the efficiency of the engine can be increased by passing a higher gas flow temperature through the turbine. However, the turbine inlet temperature is limited by the material properties of the turbine, especially for the first stage airfoils since these are exposed to the highest temperature gas flow. As the gas flow passes through the various stages of the turbine, the temperature decreases as the energy is extracted by the rotor blades.

Another method of increasing the turbine inlet temperature is to provide more effective cooling of the airfoils. Complex internal and external cooling circuit designs have been proposed using a combination of internal convection and impingement cooling along with external film cooling to transfer heat away from the metal and form a layer of protective air to limit thermal heat transfer to the metal airfoil surface. However, since the pressurized air used for the airfoil cooling is bled off from the compressor, this bleed off air decreases the efficiency of the engine because the work required to compress the air is not used for power production. It is therefore wasted energy as far as producing useful work in the turbine.

Recently, airfoil designers have proposed a new air cooled turbine rotor blade or stator vane design that is referred to as a spar and shell airfoil, U.S. Pat. No. 7,080,971 issued to Wilson et al. on Jul. 25, 2006 and entitled COOLED TURBINE SPAR SHELL BLADE CONSTRUCTION discloses one of these latest airfoils, the entire disclosure being incorporated herein by reference. The spar and shell construction allows for the use of a shell that can be made from an exotic high temperature alloy or material such as tungsten, molybdenum or columbium that could not be used in the prior art investment casting blades or vanes. Airfoils made from the investment casting technique are formed from nickel super-alloys and as a single piece with the internal cooling circuitry cast into the airfoil. Film cooling holes are then drilled after the airfoil has been cast. Without much improvement in the cooling circuitry of these investment cast nickel super-alloy airfoils, the operating temperature is about at its upper limit.

Thus, these new spar and shell airfoils will allow for the shell to be formed from the exotic high temperature materials because the shell can be formed using a wire EDM process to from a thin wall shell, and then the shell is supported by a spar to form the blade or vane. The exotic high temperature metals such as tungsten, molybdenum or columbium cannot be cast using the investment casting process because of their very high melting temperatures. However, thin walled shells can be formed using the wire EDM process. With a spar and shell airfoil having a shell made from one of these materials, the operating temperature can be increased way beyond the maximum temperature for an investment cast airfoil. Thus, the engine turbine inlet temperature can be increased and the engine efficiency increased.

One major problem with these new spar and shell airfoils that the applicants have discovered is that the shell and the spar have high thermal stress loads formed due to the large temperature differences. The shell is exposed to the high temperature gas flow while the spar, which can be made from the investment cast materials, is cooled with cooling air so that the temperature is much lower than the shell. If the shell is rigidly secured to the spar, the temperature difference will produce high thermal stress loads on ribs that connect the shell to the spar. A number of ribs are required to hold the thin shell wall to the spar when a high cooling air pressure is formed between the shell and the spar that tends to push the shell wall away from the spar. Thus, the ribs are used to hold the thin shell wall to the spar so that high pressure cooling air can be used between these two surfaces. If the ribs are rigidly fixed to the spar and the shell, then the high thermal stress loads will produce cracks in the ribs. U.S. Pat. No. 7,247,002 issued to Albrecht et al. on Jul. 24, 2007 and entitled LAMELLATE CMC STRUCTURE WITH INTERLOCK TO METALLIC SUPPORT STRUCTURE shows a composite turbine component with a ceramic shell secured to a metallic spar in which individual lamellae are supported directly by the support structure via cooperating interlock features formed on the lamella and on the support structure respectively. Mating load-transferring surfaces of the interlock features are disposed in a plane oblique to local axes of thermal growth in order to accommodate differential thermal expansion there between with delta alpha zero expansion. This design will allow for differential thermal growths along the airfoil spanwise (radial) direction parallel to the interlocking features, but not in a direction perpendicular to this such as along a direction parallel to the chordwise direction (the line from the leading edge to the trailing edge through the center of the airfoil cross section in the plane of FIG. 1 of the Albrecht patent).

BRIEF SUMMARY OF THE INVENTION

It is an object of the present invention to provide for a turbine airfoil of the spar and shell construction with ribs that secure the shell to the spar and form a seal for adjacent cooling channels.

It is another object of the present invention to provide for a turbine airfoil of the spar and shell construction with ribs that prevent bulging of the shell from the spar due to high pressure cooling air.

It is another object of the present invention to provide for a turbine airfoil of the spar and shell construction with ribs that allow for thermal growth between the shell and the spar to prevent damage due to high thermal stress loads.

These objectives and more can be achieved by the dog bone struts used to secure the shell to the spar that will provide a seal between adjacent cooling channels formed by the shell and spar walls, to prevent bulging of the shell from the spar due to high pressure cooling air, and to allow for thermal growth between the shell and the spar due to exposure to the high temperatures. The dog bone struts have a FIG. 8 cross sectional shape with holes on both of the ends to allow for a slight pivoting motion when the shell will be displaced with respect to the spar along a chordwise direction. The shell and spar both includes rounded channels to receive the dog bone strut. The dog bone struts and the channels that receive the struts extend along the airfoil length in the spanwise direction and are spaced around the shell surface to form multiple cooling channels.

BRIEF DESCRIPTION OF THE SEVERAL VIEWS OF THE DRAWINGS

FIG. 2 shows a cross section view along the airfoil spanwise direction with the shell secured to the spar by a number of dog bone struts.

FIG. 3 shows a detailed view of a close up of a section of the airfoil of FIG. 2.

DETAILED DESCRIPTION OF THE INVENTION

The present invention is an air cooled turbine airfoil that can be a rotor blade or a stator vane, and in which the airfoil has a shell and spar construction. The shell is a thin walled shell to provide for relatively low metal temperature due to backside convection and impingement cooling, the shell being secured to the spar by a number of dog bone struts that prevent bulging of the shell due to high cooling air pressure between the spar and the shell, to produce a seal between adjacent cooling channels formed between the shell and the spar, and to allow for thermal growth of the shell with respect to the spar due to temperature differences.

Figure 1:
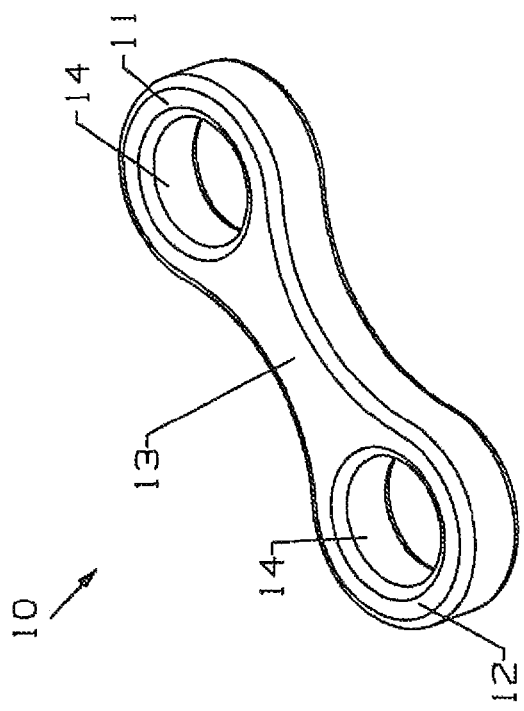
FIG. 1 shows a schematic view of a dog bone strut used in the shell and spar airfoil of the present invention but with a shortened length.

FIG. 1 shows a view of the dog bone strut 10 that is used to secure the shell to the spar. The dog bane strut 10 has a FIG. 8 cross section shape with two ends 11 and 12 having a circular cross sectional shape and a narrow neck 13 connecting the two circular ends, where the two circular ends can have a hole 14 located in the center of the circular end. The dog bone strut 10 shown in FIG. 1 has a shortened spanwise (radial direction of the airfoil parallel to an axis of the central holes) for display purposes. The actual part used would have an axial length equal to the grooves formed within the shell and spar that the strut would be mounted within. The strut 10 can be made from a high temperature resistant material which would allow for casting the strut or extruding the strut from the material as long as the material can withstand the temperature of the shell surface in which one of the ends is secured to. In one embodiment, the strut 10 is made from Haynes 247 and formed by extrusion.

FIG. 2 shows a cross section of the turbine airfoil with the shell 21 having a thin wall construction and forming the airfoil surface with a leading edge and a trailing edge and a pressure side wall and suction side wall extending between the two edges. The spar 22 has a similar shaped airfoil cross sectional shape to follow the inner surface of the shell, and defines a cooling air supply channel 23 in which cooling air can be supplied to the airfoil assembly. Both the shell 21 and the spar 22 has raised sections 24 each with a circular opening 25 that forms the support surfaces for the dog bone strut 10. The raised sections 24 have the circular openings 25 on an inner end with a narrow gap or openings on the outer end to prevent the dog bone strut 10 from pulling out from the circular opening 25. The raised sections 25 also form a gap on the sides of a narrow neck 13 on the dog bone strut 10 to allow for a slight pivoting motion of the strut 10 within the two circular openings of the shell 21 and the spar 22. Opposed raised sections on the shell 21 and the spar 22 form two opposed circular openings 25 in which one dog bone strut 10 is mounted as seen in FIGS. 2 and 3. A narrow gap 27 is left between facing surfaces of the raised sections to allow for relative movement between the shell and the spar in the airfoil chordwise direction. The dog bone strut 10 is mounted within the two circular openings 25. FIG. 3 shows a detailed view of one of the dog bone struts 10 mounted within the openings of the raised sections formed between the shell 21 and the spar 22.

The dog bone struts 10 not only hold the shell 21 to the spar 22 to prevent bulging of the shell 21 from the spar 22, but form a seal between adjacent cooling channels 26 formed between the shell 21 and the spar 22. Pressurized cooling air is supplied to the airfoil to provide convection cooling for the inner or backside surface of the shell 21 and even impingement cooling if designed into the airfoil. The pressure of the cooling air within one cooling channel 26 may be at a different temperature than an adjacent cooling channel due to a backflow margin requirement if film cooling holes are used in the shell. Thus the need for the sealing capability. The struts 10 prevent the shell wall from bulging away from the spar 22 due to the high pressure of the cooling air within the cooling channel 26 and provide a seal. The holes 14 in the strut 10 reduce the weight of the strut but can be eliminated for ease in manufacturing if the extra weight is not an issue.

Figure 4:
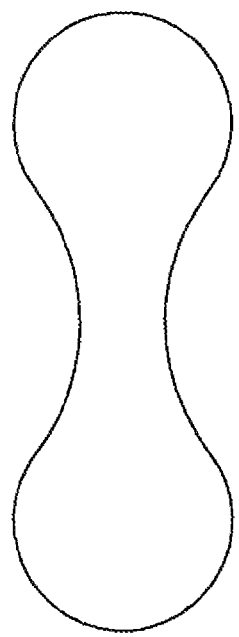
FIG. 4 shows a second embodiment of the dog bone seal of the present invention.
Figure 5:
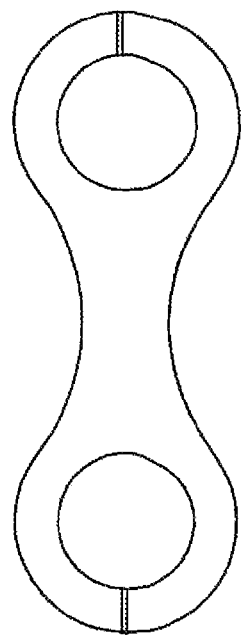
FIG. 5 shows a third embodiment of the dog bone seal of the present invention.

The dog bone struts can be formed without the holes as in the FIG. 4 embodiment to be a solid strut for added strength, or can be formed with a cut on the ends of the dog bone that result in a thin gap to add flexibility to the strut as seen in FIG. 5. The cut will extend the entire length of the strut.

In another embodiment of the spar and shell airfoil, the spar can include impingement cooling holes to direct impingement cooling air from the central cooling supply channel 23 toward the backside surface of the shell and then channel the spent cooling air to film cooling holes or blade tip cooling holes for discharging the spent impingement cooling air from the airfoil. Also, the cooling channels formed between the shell and the spar can be connected in series to produce a serpentine flow cooling circuit for near wall cooling of the shell. The cooling air can then be discharged out to a trailing edge cooling channel and through a row of trailing edge exit holes to be discharged from the airfoil.

To assemble the composite airfoil, the shell 21 is paced in position over the spar 22 to align the opposing raised sections 24 and therefore the circular openings 25, and then the dog bone strut 10 is inserted into the circular openings 25. In some cases, due to the design of the composite airfoil, the dog bone struts 10 may have to be inserted into one of the shell 21 and spar 22 first, and then the assembly inserted into the other one of the shell 21 and spar 22 to complete the composite airfoil assembly. In the present invention, the shell 21 is formed from an exotic high temperature metallic material such as tungsten, molybdenum or columbium using an electric discharging machining process such as wire EDM to form a thin wall shell with the raised sections 24 having the circular openings 25 formed by the wire EDM process as a single piece shell. The spar 22 can be formed from well known prior art materials and processes such as from nickel super-alloys using the investment casting process since the operating temperature of the spar 22 with adequate cooling will be within an acceptable range.

We claim:

1. An air cooled turbine airfoil comprising:
a shell having an airfoil shape with a leading edge, a trailing edge, and a pressure side wall and a suction side wall extending between the leading edge and the trailing edge;
a spar forming an internal cooling air supply channel;
both the shell and the spar have a plurality of raised sections each with a circular opening on an inner side of the raised section and a narrow gap on an outer side of the raised section;
a dog bone strut mounted within opposed raised sections between the shell and the spar, the dog bone strut having a figure eight cross section shape with two ends having a circular cross section shape and a narrow neck connecting the two circular ends; and,
the circular openings within the raised sections and the dog bone struts form a seal between adjacent cooling channels, prevent bulging of the shell from the spar due to cooling air pressure within the cooling channels, and allow for thermal growth between the shell and the spar in a chordwise direction and a spanwise direction of the airfoil.

2. The air cooled turbine airfoil of claim 1, and further comprising:
the raised sections have facing surfaces that form the narrow gap when the dog bone strut is mounted within the circular openings to allow for relative chordwise motion between the shell and the spar.

3. The air cooled turbine airfoil of claim 1, and further comprising:
the raised sections have a narrow opening on the inner ends so that the dog bone strut can pivot within the circular openings during relative chordwise motion between the shell and the spar.

4. The air cooled turbine airfoil of claim 1, and further comprising:
the dog bone struts are formed from a high temperature metallic material that can be extruded to form the strut.

5. The air cooled turbine airfoil of claim 1, and further comprising:
the shell is formed from one of tungsten, molybdenum and columbium.

6. The air cooled turbine airfoil of claim 5, and further comprising:
the shell is a thin walled shell.

7. The air cooled turbine airfoil of claim 1, and further comprising:
the airfoil is a rotor blade for use in an industrial gas turbine engine.

8. The air cooled turbine airfoil of claim 1, and further comprising:
the airfoil is a stator vane for use in an industrial gas turbine engine.

9. The air cooled turbine airfoil of claim 1, and further comprising:
the raised sections of the shell and the spar extend the length of the shell; and,
the dog bone struts are each a single piece and extend the length of the raised sections of the shell and the spar.

10. The air cooled turbine airfoil of claim 1, and further comprising:
the dog bone strut includes a cut on the outer ends to provide flexibility to the strut.

* * * * *